S. M. BOLING.
ATTACHMENT FOR SCALE BEAMS.
APPLICATION FILED JULY 9, 1908.
924,961.
Patented June 15, 1909.
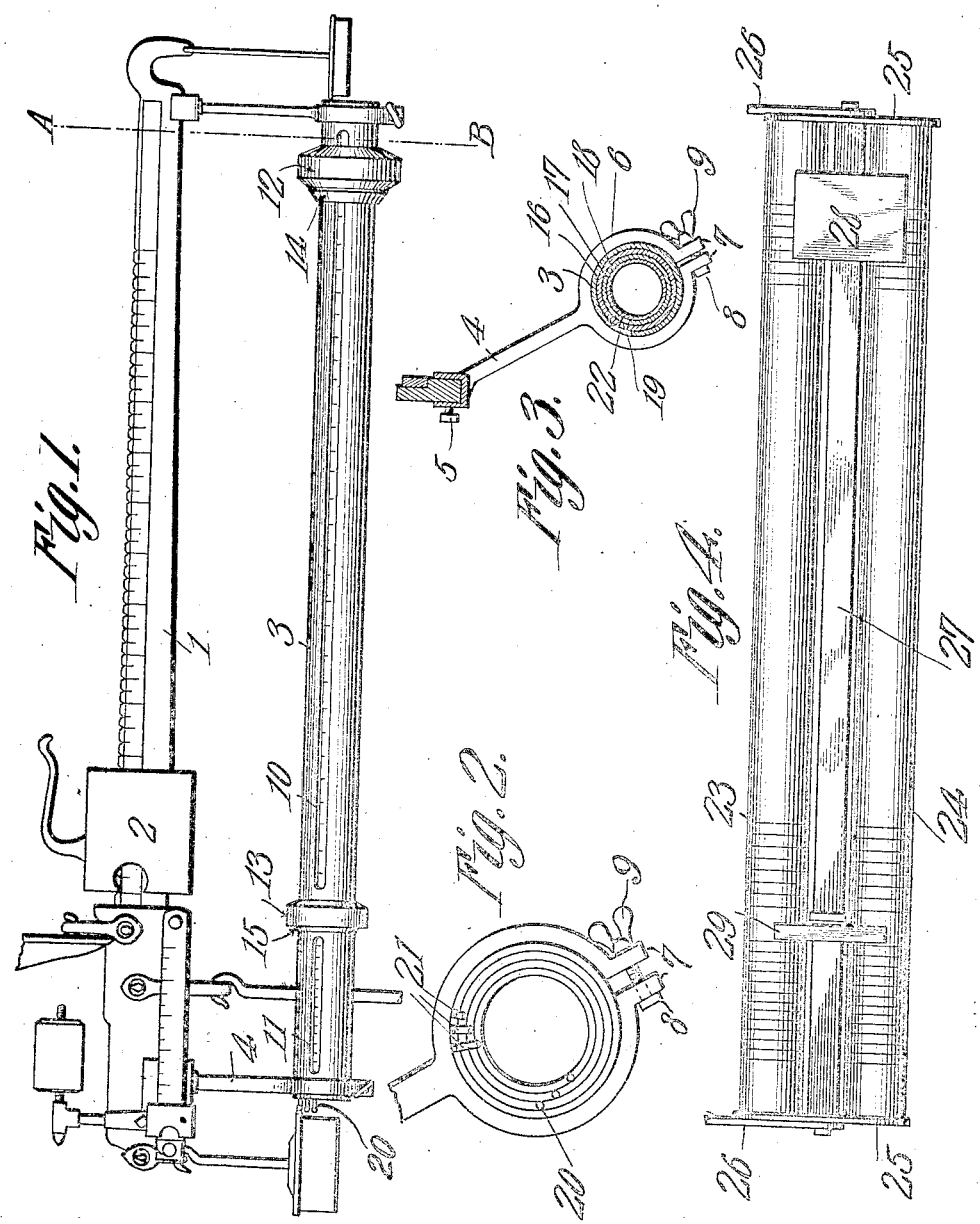

UNITED STATES PATENT OFFICE.

SAMUEL M. BOLING, OF CHANDLER, OKLAHOMA.

ATTACHMENT FOR SCALE-BEAMS.

No. 924,961.    Specification of Letters Patent.    Patented June 15, 1909.

Application filed July 9, 1908. Serial No. 442,743.

*To all whom it may concern:*

Be it known that I, SAMUEL M. BOLING, a citizen of the United States, residing at Chandler, in the county of Lincoln and State of Oklahoma, have invented a new and useful Attachment for Scale-Beams, of which the following is a specification.

This invention has reference to improvements in attachments for scale beams and is designed more particularly for use with large platform scales adapted for heavy weights, although it may be used in connection with smaller scales.

The object of the invention is to provide a means whereby a load of grain or other material may be weighed for gross weight, after which the material may be removed from the vehicle or container and the said vehicle or container may then be placed upon the scale platform and balanced when the attachment will indicate the weight of the material removed, or its price or any other indication desired.

The invention comprises essentially a multiple bar provided with means for suspending it from a scale beam of ordinary construction and having rotatable cylindrical indices containing weights or prices or both for any number of different kinds of materials. The bar is provided with two pea weights each movable over and in operative relation to an individual portion of the index or indices. With such a structure, with the supplemental pea weights at a predetermined zero position, the gross weight of a loaded container, say a vehicle loaded with grain, is readily taken by the sliding or removable weight provided with the ordinary scale beam. The load may then be transported to any desired point of delivery and the emptied vehicle is then again placed upon the scale platform with the ordinary scale weight in the positions indicating the gross weight. Now one of the supplemental pea weights is moved from the zero position in a direction in opposition to the movement of the main scale beam weight when the gross weight was ascertained, until the scale is balanced. Then if this balancing should not occur at a marked index point, then the supplemental pea weight is moved backward toward the direction from which it was first advanced, until its indicating edge or other indicating means shall coincide with the next higher division. The index is so marked that the pointer of the larger supplemental pea weight will indicate the amount that was removed from the vehicle by larger denominations. To ascertain overweight within the predetermined unit then the smaller pea weight is employed in like manner to the larger one, the whole range of the smaller pea weight being within the limits of one of the denominations of the larger pea weight. Thus it is possible by the device constituting the subject matter of the present invention to ascertain, for example, the number of bushels of wheat, or oats, or corn, whether shelled or in the ear or any other material, and also the number of pounds overweight in addition to the number of bushels so indicated. Of course if some other measure than that of bushels be desired, then the scale will be graduated accordingly. Or a single scale may be graduated to several different units. Or several scales may be united in the same structure, each one being independent of the others in its operation. Furthermore, not only the measure of the weight or quantity, but indications as to price per unit or fractions of units may be placed upon the scale indices so that the device will not only give indications as to the weight but also as to the price or value of the load in accordance with the quantity or weight of the load.

The invention will be best understood from a consideration of the following detail description taken in connection with the accompanying drawings forming a part of this specification, in which drawings, Figure 1 is a side elevation of an ordinary platform scale beam, with one form of the improved attachment applied thereto. Fig. 2 is an end view of the attachment on a larger scale than Fig. 1. Fig. 3 is a cross section on the line A—B of Fig. 1. Fig. 4 is a view of another form of the attachment.

Referring to the drawings, there is shown a scale beam 1 which may be taken as indicative of any type of scale beam to which the invention is adapted. This scale beam is provided with the ordinary pea weight or poise 2, and with such other parts as are usually present in scale beams but which need not be specifically referred to in the drawings.

As shown in Fig. 1 the main portion of the attachment consists of a tubular member 3 which may be of sufficient length to extend from the free end of the scale beam 1 to a point some distance beyond the pivot point of said scale beam. The tubular member is supported at each end in a suitable bracket best shown in Fig. 3. This bracket consists of a bar 4 provided at one end with a clip 5 designed to straddle the lower edge of the scale beam 1 and may be secured thereto in any appropriate manner, as for instance by a set screw 5. The other end of the bar 4 is formed into an annular yoke 6 having its free ends closely approaching and there formed with ears 7 normally parallel one with the other or substantially so, and through these ears is passed a bolt 8 to which is applied a thumb nut 9 so that the tube 3 may be readily inserted in the yoke 6, and then be firmly clamped by said yoke by a suitable manipulation of the thumb nut 9.

The tubular member 3 is held stationary by the bracket support 4 and the clamp yoke 6. Extending through the wall of the tubular member or casing 3 are two longitudinal slots 10 and 11 in line one with the other. The length of the slot 10 is substantially that of the travel of the pea weight 2 on the scale beam 1. The length of the slot 11 is considerably less than that of the slot 10, and extends from a point about coincident with the pivotal support of the scale beam 1 to the end of the casing 3 beyond the pivot point of the scale beam or nearly to this point.

Mounted upon the exterior of the casing 3 are two annular poise weights 12 and 13, the poise or pea weight 12 is considerably larger than the pea weight 13 and is designed to operate in conjunction with the slot 10, while the pea weight 13 is designed to operate in conjunction with the slot 11. One edge of each of these weights is suitably thinned as indicated at 14 and 15 respectively to be utilized as indicating edges. However, a suitable pointer or any other indicating means may be used in conjunction with the said weights 12 and 13.

Within the tubular casing 3 are housed a number of concentric tubes 16, 17 and 18 in the particular structures shown in Figs. 2 and 3, but this number of tubes may be greater or smaller as desired. Each of the tubes 16, 17 and 18 except the innermost one is provided with longitudinal slots 19 corresponding to the slots 10 and 11 of the casing 3. The outer surface of each tube 16, 17 and 18 is supplied with suitable indications in annular columns, and so arranged that a single longitudinal series may be observable at any one time through the slots 10 and 11 of the casing 3, while all the several indications may be made visible successively by a suitable rotation of the tubes or sleeves 16, 17 and 18.

In order that the several index markings in the annular columns on the several sleeves or tubes 16, 17 or 18 may be brought in succession to visible coincidence with the slots 10 and 11 each of the sleeves 16, 17 and 18 is made individually rotatable about its longitudinal axis. Each individual tube 16, 17 and 18 may be provided with any suitable means for manipulating it in a manner to rotate it upon its longitudinal axis and in Figs. 1 and 2 one end of each tube 16, 17 and 18 is shown as provided with a projecting pin 20 by means of which the tube may be readily rotated. It will be readily understood of course that this is only indicative and not by any means the only form of manipulating device which may be used in conjunction with the several tubes. It is advisable also that each tube 16 and 17 should be yieldingly held in a position where its slot 19 is coincident with the slots 10 and 11 in the casing 3, and for this purpose suitable yielding stops 21 may be employed, and may consist of any common form of yielding stop for determining a predetermined position without holding the part in such position against a moderate force tending to displace the part. Any other means for determining the position of the sleeves 16 and 17 so that the slots 19 shall coincide with the slots 10 and 11 may be employed. The slots 10 and 11 may also be provided with a magnifying transparent covering 22 serving not only to exclude dust and dirt but also suitably enlarging the indications upon the several sleeves within the casing 3.

Suppose for purposes of illustration that it is desirable to deliver a wagon load of wheat in bulk and to ascertain either the quantity or the price or both of the wheat delivered. The loaded wagon is drawn upon the scale platform and the gross weight is ascertained by means of the sliding poise 2, the two supplemental pea weights 12 and 13 being then in the zero position, that is as viewed in Fig. 1, these two weights are at their greatest extent of movement toward the right, which is in the particular illustration shown the limit of their movement toward the free end of the scale beam 1. It is of course, assumed that the attachment has been properly applied to the scale beam 1 and the whole structure has been suitably balanced so that with the supplemental pea weights in the zero position, the main pea weight 2 will indicate correct weight. Note is taken of the gross weight thus shown by the main scales and the wagon is driven to the desired point where the grain is to be delivered. On the return of the empty wagon it is again placed upon the scale platform and the pea weight 2, if it has been disturbed from the position showing the gross weight, is replaced in the proper position in accordance with the note taken.

In the meantime if the number of bushels contained in the wagon or vehicle is to be ascertained and this particular index is upon say sleeve 16, then the latter is rotated upon its longitudinal axis, until the particular longitudinal series of indications on the sleeve which will designate bushels of wheat is exposed through the slots 10 and 11. Now the pea weight 12 is moved toward the pivot end of the scale beam 1 until the scale beam is balanced and the index number to which the pea weight has been brought will indicate the number of bushels which were contained in the vehicle and which have been removed therefrom. It is probable however, that the vehicle did not contain an even number of bushels and when the scale beams are balanced it will be found that the poise or pea weight 12 indicates some intermediate position between two bushel indications. Under these circumstances the pea weight 12 is moved back to the next adjacent higher indication of bushels and the pea weight 13 is moved forward toward the left as viewed in Fig. 1, until the scale beam is again balanced when the indexed enumerations visible through the slot 11 will show fractions of a bushel, it being understood that the entire range of movement of the pea weight 13 is equivalent to one of the larger denominations visible through the slot 10. Suppose it is also desirable to obtain the price of the number of bushels and fractions of bushels, then it is only necessary to bring the proper line of indications into visibility through the slots 10 and 11, then the price in units will be seen through the slot 10 and the divisions of fractions of units through the slot 11, that is to say that slot 10 will show the price in say dollars, and the slot 11 will show the price in say cents.

If the indexed designations desired should be upon the cylinder 17 instead of upon the cylinder 16, then the sleeve or cylinder 16 is rotated upon its longitudinal axis until its slot 19 is coincident with the slots 10 and 11 of the casing 3. Now the sleeve 17 is rotated until the desired indexed enumerations are visible through both the slots 10 and 11 and the slot 19 of the sleeve 16. If the indexed enumerations are upon the sleeve 18, then both the sleeves 16 and 17 are brought to their neutral position with their slot 19 coincident with the slot 10 and 11 of the casing 3, and the indexed indications on the sleeve 18 will then be visible as the said sleeve is rotated to the desired position.

The several sleeves 16, 17 and 18 may fit tight enough within each other and within the casing 3 to be held frictionally in any adjusted position, or these sleeves may be rendered slightly elastic by splitting or otherwise and the casing 3 may be likewise treated, and then an extra turn upon the thumb screws 9 will be sufficient to lock the several sleeves in any adjusted position. This would prevent accidental displacement of the index sleeve should it be desirable to ascertain the contents of a large number of containers in succession when said containers are filled with the same kind of material.

In Fig. 4 is shown a somewhat different form of multiple index carrier which the indexed sleeves instead of telescoping one within the other, may be of the same diameter and placed side by side. In the particular structure shown in Fig. 4, there are two cylindrical indexes 23 and 24 mounted for rotation at their ends in connecting frames 25 adapted to space the cylinders 23 and 24 apart for a distance in parallel relation. The frames 25 are carried by brackets 26 which may be attached to the scale beam similar to the mode of attachment shown in Figs. 1 and 3.

Intermediate of the two cylinders 23 and 24 is a longitudinally arranged bar 27 upon which is mounted for sliding two pea weights 28 and 29 of appropriate differentiated size for the purposes of the invention. The pea weights are made to extend into indicating relation to both cylinders 23 and 24 at the same time. With such a structure one cylinder say the cylinder 23 might contain index enumerations for weights or quantities while the cylinder 24 might contain price indications, so that both the weight or quantity and the price could be seen together at a glance. Of course any other arrangements of indexes could be used.

By the use of the tubular indexes of Fig. 1 or the cylindrical indexes of Fig. 4, a large number of different indications may be brought within a small space, and the indicating portions of the pea weight may always be brought into close relation to the desired portion of the indexes so that the eye is not compelled to follow along long columns of figures to find the right indication, with the attendant liability of making mistakes.

With the structures of Figs. 1, 2 and 3, it will be understood of course, that the invention is not limited to the use of three sleeves 16, 17 and 18, but it will be understood that one, two, three or more sleeves may be used as desired.

What is claimed is:

1. An attachment for ordinary scale beams comprising a support, means for attaching the support to a scale beam in a position parallel therewith, a number of independently movable members having index tabulations thereon carried by said support, a sliding weight on said support having a zero position at the end of the support adjacent to the free end of the scale beam and having an active movement in coöperative relation to said index members for a predetermined distance toward the pivoted end of said scale beam, and another sliding weight on the same support having a zero position adjacent to the inner end of the range of movement of the first named sliding weight and having an active movement in coöperative relation with said index members in the same sense as the said first named weight.

2. A scale beam attachment comprising a supporting member adapted to be attached to a scale beam, a plurality of peas or poises on the supporting member and each movable actively away from the outer end of the scale beam, and at individually different sections thereof, and a plurality of index members each having separate sections for the different peas or poises and each individually movable to bring a different portion of the individually different sections of its indicating face into operative relation to the respective peas or poises carried by the support.

3. An attachment for scale beams comprising a sleeve or casing having longitudinal slots through its walls and means for supporting the said casing from the scale beam, sliding peas or poises exterior to the said casing and carried thereby, and a plurality of index sleeves at successively greater distances from the active exterior of the casing, each inner sleeve having index tabulations and each relatively outer index carrying sleeve having means whereby the index tabulations of the next inner sleeve may be viewed therethrough.

4. An attachment for ordinary scale beams comprising a sleeve or casing having through its walls longitudinal slots of different lengths and in line with the other, means for supporting said sleeve from the scale beam with the longer slot coincident with the indicating portions of the scale beam, and the shorter slot extending beyond the pivot of the scale beam in a direction remote from the free end of the scale beam, peas or poises, one for each slot and mounted on said casing to move longitudinally thereon, and separate index means interior to the casing and visible through the longitudinal slots in said casing.

5. An attachment for scale beams comprising a cylindrical casing having longitudinal through slots in line one with the other, means for supporting said casing from a scale beam in parallel relation thereto, sliding peas or poises exterior to said casing and carried thereby in operative relation to the slots therethrough, and a plurality of sleeves interior to the casing and each sleeve except the innermost having through longitudinal slots matching the slots in the outer casing.

6. An attachment for scale beams comprising a cylindrical sleeve having longitudinal slots through its walls, the slots being of different lengths and in line one with the other, means for supporting the casing from a scale beam with the slots extending on opposite sides of the scale beam pivot, annular poises mounted on the casing with indicating means in operative relation to the slots, and a plurality of index sleeves housed in the casing in telescoping relation, each of said sleeves except the innermost having through slots matching the slots in the outer casing, and a transparent closure for the slots in the outer casing.

7. An attachment for scale beams comprising a cylindrical casing having through slots therein, means for supporting said casing from a scale beam, sliding peas or poises on said casing exterior thereto, and individually rotatable telescoping sleeves within the casing and provided with exterior index indications, each of said sleeves exterior to another sleeve being provided with a through slot matching the slots in the outer casing.

In testimony that I claim the foregoing as my own, I have hereto affixed my signature in the presence of two witnesses.

SAMUEL M. BOLING.

Witnesses:
CLYDE RANDEL,
NELLE WOLFE.